UNITED STATES PATENT OFFICE.

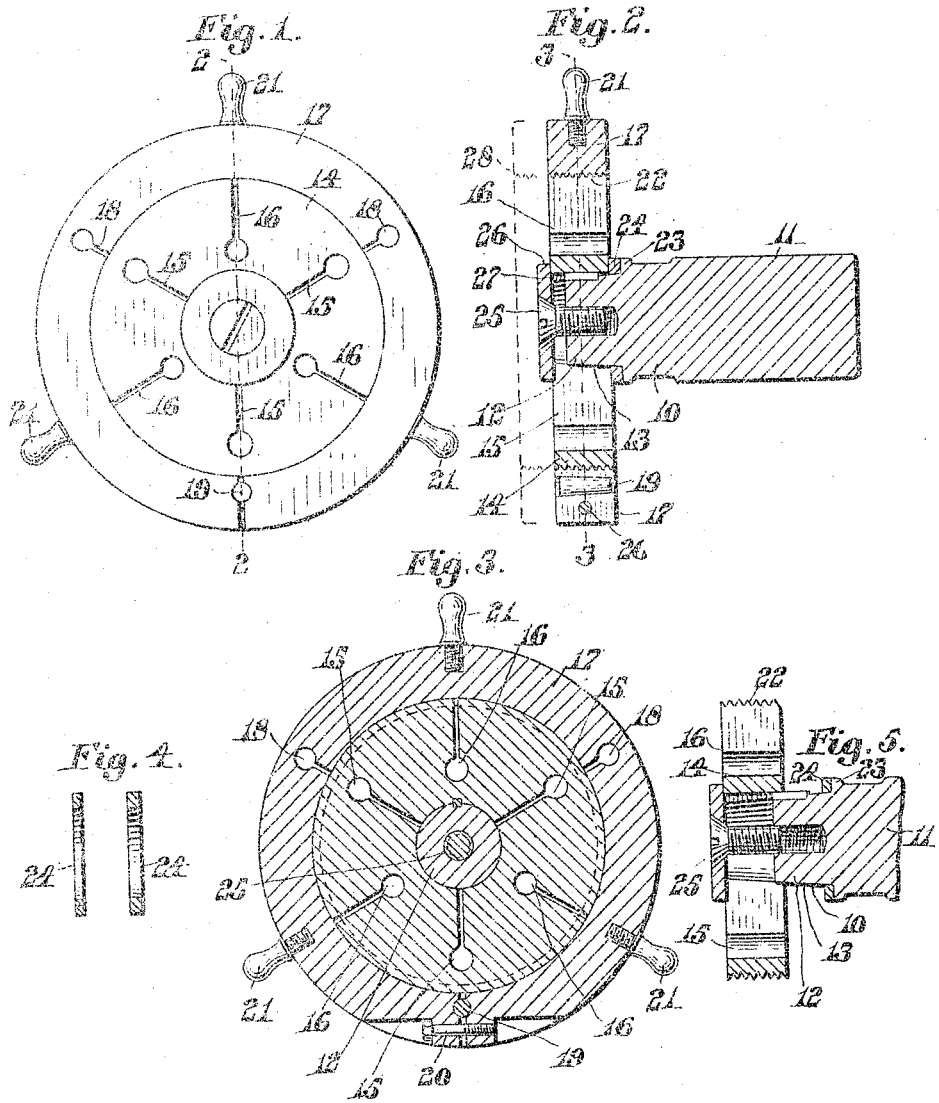

WILLIAM H. NICHOLS, OF WALTHAM, MASSACHUSETTS.

THREAD-GAGE.

1,032,764.

Specification of Letters Patent. Patented July 16, 1912.

Application filed March 13, 1911. Serial No. 614,447.

*To all whom it may concern:*

Be it known that I, WILLIAM H. NICHOLS, a citizen of the United States of America, and a resident of Waltham, in the county of Middlesex and State of Massachusetts, have invented certain new and useful Improvements in Thread-Gages, of which the following is a specification.

This invention relates to measuring instruments but more particularly to thread gages, and has for its object the providing of a simple, efficient, and inexpensive device which may be easily adjusted to accurately gage either male or female threads.

In a device of this class, it is necessary to accurately and uniformly expand or contract the gage over its whole gaging surface in order to be able to determine the thread diameters. Numerous types of gages have heretofore been constructed, but these have generally been limited in action and complex in mechanism.

Of the drawings: Figure 1 represents a front elevation of the invention complete. Fig. 2 represents a section of the same on line 2—2 of Fig. 1. Fig. 3 represents a section of the same on line 3—3 of Fig. 2. Fig. 4 represents transverse sections of two types of washers, as will be described hereinafter, and Fig. 5 represents a section similar to Fig. 2, but with the parts in a different position and the gage for male threads removed, as will be described hereinafter.

Similar characters designate like parts throughout the several figures of the drawings.

Referring to the drawings, the device consists of a block 10 which is provided with a grip or handle 11 and the forward extremity 12 which is tapered to fit the orifice 13 in the expansible member 14 said member being preferably cylindrical with its periphery concentric to said orifice 13.

The expansible member 14 is provided with transverse radial slots 15 and 16, the former opening into the orifice 13 and the latter opening on the periphery of the expansible member. These slots are here constructed key shape to permit the expansion of the member and are preferably arranged alternately with a peripheral slot directly opposite to an orifice slot to permit the member to expand uniformly. About the periphery of the expansible member 14 is a split annular member 17 which is also provided with key shape slots 18 and between the ends of this annular member 17 in tapering recesses therein is inserted the tapered plug 19 which acts as an expander for this member. A bolt or screw 20 connects the ends of the annular member and holds these ends in contact with the tapered plug 19. Seated in the periphery of the member 17 are pins 21 to permit the member to be readily turned upon the threads 22 on the periphery of the member 14.

On the plug 10 adjacent to the tapered portion thereto is an annular shoulder 23 against which rests the washer 24 which is placed upon the plug over the tapered end 12. In the front face of the tapered extremity 12 of the plug 10 is a threaded recess in which operates the screw 25, the head of which is seated in a washer 26 in such a manner that the advancing of the screw into the recess causes the washer 26 to press the member 14 on the tapered extremity 12. A key 27 is provided to prevent the member 14 from rotating on the plug 10.

The function of the washer 24 is to limit the travel of the member 14 upon the extremity 12 and to thus determine the amount of expansion of this member. This member 14 is preferably so constructed that the orifice fits tightly on the plug 10 in the position shown in Fig. 5 and the member is extended an amount depending upon the distance which it can be forced on this tapered surface. This distance is determined by the thickness of the washer and thus different sizes of washers are placed upon the plug when it is desired to vary the circumference of the member 14.

The member 17 is placed upon the member 14 when it is desired to gage a male thread and is usually set thereon in the position shown in dotted lines in Fig. 2 for that purpose. When the device is not in use, the member 17 is placed in the position shown in solid lines in that figure to protect the threads of both members. When the device is to be used to measure female threads, the member 17 is preferably removed as is shown in Fig. 5 of the drawings.

In describing the operation of the device, the same will first be treated in connection with the gaging of a female thread and the member 17 will be assumed to have been removed. A washer 24 should first be inserted over the tapered extremity 12 of the plug 10, the extremity 12 of the plug inserted in the orifice 13 of the expansible member 14, the screw 25 and washer 26 inserted in the position shown in Fig. 5, and then the screw 25 advanced until the member 14 has been forced on the extremity 12 into contact with the washer. The member 14 will thus have been expanded a predetermined amount depending on the thickness of the washer and the operator grasping the handle 11 should screw the threads of the member into the female threads to be gaged. If the member 14 is found to be too large to fit these threads, its diameter may be decreased by putting in a slightly thicker washer, and a thinner one may be used if the diameter of the member 14 is too small. When the member 14 has been adjusted to exactly fit the threads, the diameter thereon can be exactly determined by noting the thickness of the washer 24 used.

To gage a male thread, the member 14 is adjusted in the manner heretofore described in gaging a female thread and then the member 17 is expanded by the tapered plug 19 sufficiently to permit it to be placed with a portion of its inner surface inclosing the member 14, this member 17 is then contracted by gradually withdrawing the tapered plug 19 and tightening the contracting screw 20 until the member 17 fits the periphery of the member 14 and the female threads on the former actually mesh with the male threads on the member 14. The member 17 should then preferably be in approximately the position shown in dotted lines in Fig. 2 and the threads 28 could be meshed with the male threads on the object to be gaged. If the threads 28 are found to be of too great diameter to fit the threads on the object, a thicker washer may be placed on the plug 10 thus contracting the member 14, and the member 17 may be contracted sufficiently to again fit the member 14. As in the case with the gaging of a female thread, the thickness of the washer 24 determines the thread diameter of the object.

If desired, the member 17 may be used independently of the rest of the device and the gage of the thread determined by the position of the plug 19. The key shaped slots 18 in this member permit it to uniformly contract and expand so that a perfect cylinder is formed at all times. The same is true of the member 14 as the construction and arrangement of the slots permit of this uniform expansion.

The applicant is aware that a considerable number of variations in the construction and mode of operation of this device could be made by any one skilled in the art without departing from the scope of his invention and he does not care to be limited to the particular embodiment herein shown and described.

It is believed that the construction and many advantages of the invention will be thoroughly understood from the foregoing.

Having thus described my invention, I claim:

1. In a device of the class described, the combination of a body portion having a threaded periphery and provided with an orifice therein, said body portion forming an endless expansible gage-member; and an expander having a plane surface adapted to enter said orifice and expand said body portion without distortion of the threads, said threads being moved outwardly at right angles to the axis of said expander.

2. In a device of the class described, the combination of a body portion having a threaded periphery and provided with a tapering orifice concentric therewith, said body portion forming an endless expansible gage-member; and an expander provided with a tapering portion having a plane surface adapted to enter said orifice and expand said body portion without distortion of the threads, said threads being moved outwardly at right angles to the axis of said expander.

3. In a device of the class described, the combination of a body portion having a threaded periphery and provided with a tapering orifice therein, said body portion forming an endless expansible gage-member; a tapering plug having a plane surface adapted to enter said orifice and expand said body portion without distortion of the threads, said threads being moved outwardly at right angles to the axis of said expander; and means for advancing said plug within said orifice.

4. In a device of the class described, the combination of a gage-member provided with a tapering orifice concentric therewith said member having in its periphery radial slots terminating near the wall of said orifice and other radial slots in the wall of said orifice terminating near the periphery of said member; and an expander adapted to enter said orifice.

5. In a device of the class described, the combination of a gage-member provided with a tapering orifice concentric therewith said member having in its peripheral wall and in the wall of said orifice radial slots arranged alternately and terminating near the opposite wall; and an expander adapted to enter said orifice.

6. In a device of the class described, the combination of a gage-member provided with an orifice and having in its periphery radial slots terminating near the wall of said orifice and other radial slots in the wall of said orifice terminating near its periphery, each of said peripheral slots being disposed on the opposite side of said orifice from one of said orifice slots; and an expander adapted to enter said orifice.

7. In a device of the class described, the combination of an expansible gage-member; means for expanding said member; and means surrounding said expander and abutting the end face of said gage member for predetermining the movement of said expanding means.

8. In a device of the class described, the combination of an expansible gage-member provided with an orifice therein; an expander having a plane surface adapted to enter said orifice to expand said gage-member; and means surrounding said expander and abutting the end face of said gage member for varying the limit of travel of said expander.

9. In a device of the class described, the combination of an expansible gage-member, provided with a tapering orifice therein; a tapering plug adapted to enter said orifice to expand said gage-member; and removable means surrounding said plug and abutting the end face of said gage member for limiting the advance of said expander within said orifice.

10. In a device of the class described, the combination of a gage-member provided with an orifice and having a radial slot in its periphery terminating at a point removed from said orifice and a similar slot in the wall of said orifice on the opposite side of said orifice from said peripheral slot and terminating at a point removed from said wall; and an expander adapted to enter said orifice.

11. In a device of the class described, the combination of an expansible gage-member provided with a tapering orifice therein; a tapering plug adapted to enter said orifice to expand said gage-member and provided with a shoulder adjacent to said tapering portion; and means acting between said shoulder and said member to limit the travel of said plug to a predetermined amount.

12. In a device of the class described, the combination of an expansible gage-member provided with a tapering orifice therein; a tapering plug adapted to enter said orifice to expand said gage-member and provided with a shoulder adjacent to said tapering portion; and washers of varying thicknesses adapted to be placed upon the tapering portion of said plug to act between said shoulder and said member to limit the advance of said plug within said orifice.

13. In a device of the class described, the combination of an expansible member provided with an orifice therein and having its periphery threaded; an expander adapted to enter said orifice; and an expansible gage-member adapted to fit about the threaded periphery of the first member.

14. In a device of the class described, the combination of an expansible gage-member provided with an orifice therein; an expander adapted to enter said orifice; a supplemental gage-member provided with radial slots therein whereby it may be uniformly adjusted to permit a portion of its inner face to fit about the periphery of the expansible gage-member in any position thereof; and means for expanding said supplemental gage-member.

15. In a device of the class described, the combination of an expansible gage-member provided with an orifice therein; an expander adapted to enter said orifice; a supplemental gage-member provided with radial slots therein whereby it may be uniformly adjusted to permit a portion of its inner face to fit tightly about the periphery of the gage-member in any position of said gage-member; and a tapered plug interposed between the ends of said supplemental gage-member.

16. In a device of the class described, the combination of an expansible gage-member provided with an orifice therein; an expander adapted to enter said orifice; a supplemental gage-member comprising a split ring provided with radial slots therein whereby it may be uniformly adjusted to permit a portion of its inner face to fit tightly about the periphery of the gage member in any position of said gage-member; and a plug interposed between the ends of said annular member.

17. In a device of the class described, the combination of an expansible gage-member provided with an orifice therein; an expander adapted to enter said orifice; a supplemental gage-member comprising a split ring provided with radial slots therein whereby it may be uniformly adjusted to permit a portion of its inner face to fit tightly about the periphery of the gage-member in any position of said gage-member; a plug interposed between the ends of said annular member; and an adjusting screw connecting said ends.

Signed by me at 4 Post Office Sq., Boston, Mass., this 6th day of February, 1911.

WM. H. NICHOLS.

Witnesses:
WALTER E. LOMBARD,
NATHAN C. LOMBARD.